(12) United States Patent
Marvasti

(10) Patent No.: US 8,631,117 B2
(45) Date of Patent: Jan. 14, 2014

(54) SYSTEM AND METHOD FOR CORRELATING FINGERPRINTS FOR AUTOMATED INTELLIGENCE

(75) Inventor: Mazda A. Marvasti, Rancho Santa Margarita, CA (US)

(73) Assignee: VMware, Inc., Palo Alto, CA (US)

( * ) Notice: Subject to any disclaimer, the term of this patent is extended or adjusted under 35 U.S.C. 154(b) by 1102 days.

(21) Appl. No.: 12/194,197

(22) Filed: Aug. 19, 2008

(65) Prior Publication Data

US 2010/0046809 A1 Feb. 25, 2010

(51) Int. Cl.
*G06F 15/16* (2006.01)

(52) U.S. Cl.
USPC .............................. 709/224; 714/26; 714/39

(58) Field of Classification Search
CPC ..................................... G06F 11/079
USPC ...................... 709/224; 714/26, 39
See application file for complete search history.

(56) References Cited

U.S. PATENT DOCUMENTS

| | | | |
|---|---|---|---|
| 4,769,761 A | 9/1988 | Downes et al. | |
| 5,067,099 A | 11/1991 | McCown et al. | |
| 5,297,150 A | 3/1994 | Clark | |
| 5,661,668 A * | 8/1997 | Yemini et al. | 702/186 |
| 5,835,902 A | 11/1998 | Jannarone | |
| 6,049,792 A | 4/2000 | Hart et al. | |
| 6,216,119 B1 | 4/2001 | Jannarone | |
| 6,249,755 B1 * | 6/2001 | Yemini et al. | 702/183 |
| 6,289,330 B1 | 9/2001 | Jannarone | |
| 6,327,677 B1 | 12/2001 | Garg et al. | |
| 6,336,065 B1 | 1/2002 | Gibson et al. | |
| 6,453,346 B1 | 9/2002 | Garg et al. | |
| 6,529,954 B1 * | 3/2003 | Cookmeyer et al. | 709/224 |
| 6,591,255 B1 | 7/2003 | Tatum et al. | |
| 6,609,083 B2 | 8/2003 | Enck et al. | |
| 6,622,264 B1 | 9/2003 | Bliley et al. | |
| 6,643,613 B2 * | 11/2003 | McGee et al. | 702/186 |
| 6,647,377 B2 | 11/2003 | Jannarone | |
| 6,738,811 B1 | 5/2004 | Liang | |
| 7,050,936 B2 | 5/2006 | Levy et al. | |
| 7,080,141 B1 | 7/2006 | Baekelmans et al. | |
| 7,107,339 B1 * | 9/2006 | Wolters | 709/224 |
| 7,124,328 B2 | 10/2006 | Bowers et al. | |
| 7,251,584 B1 * | 7/2007 | Perazolo et al. | 702/183 |
| 7,286,962 B2 | 10/2007 | Di Palma et al. | |
| 7,383,191 B1 * | 6/2008 | Herring et al. | 705/1.1 |
| 7,444,263 B2 * | 10/2008 | White et al. | 702/180 |
| 7,451,210 B2 | 11/2008 | Gupta et al. | |
| 7,483,970 B2 | 1/2009 | Anuszczyk et al. | |
| 7,509,415 B2 | 3/2009 | Baekelmans et al. | |
| 7,519,624 B2 | 4/2009 | Korupolu et al. | |
| 7,668,953 B1 * | 2/2010 | Sinclair et al. | 709/224 |

(Continued)

*Primary Examiner* — Kevin Bates

(57) ABSTRACT

A system and method for correlating fingerprints in an Information Technology (IT) infrastructure for automated intelligence, where a fingerprint provides an indication of the activity and operation of the IT infrastructure immediately preceding an event. It is determined whether a correlation exists between multiple fingerprints to determine whether such fingerprints separately indicate the occurrence of the event for the same reason. If a degree of match is found to exist between the rule sets of multiple fingerprints that exceeds a certain threshold, the fingerprints are determined to indicate the occurrence of the event for the same reason and the rule sets for those fingerprints can be merged together with the probabilities that such rules will indicate the occurrence of the event adjusted accordingly. In one or more embodiments, the fingerprint matching correlation procedures are implemented to account for time or phase shifts between the rule sets in two fingerprints.

14 Claims, 11 Drawing Sheets

(56) References Cited

U.S. PATENT DOCUMENTS

| | | |
|---|---|---|
| 7,783,744 B2 | 8/2010 | Garg et al. |
| 7,814,194 B2 * | 10/2010 | Hellerstein et al. ............ 709/224 |
| 7,962,797 B2 * | 6/2011 | Goldszmidt et al. ............ 714/37 |
| 2002/0040280 A1 | 4/2002 | Morgan |
| 2002/0083168 A1 | 6/2002 | Sweeney et al. |
| 2002/0183971 A1 | 12/2002 | Wegerich et al. |
| 2003/0204789 A1 | 10/2003 | Peebles et al. |
| 2004/0068199 A1 | 4/2004 | Echauz et al. |
| 2004/0078171 A1 | 4/2004 | Wegerich et al. |
| 2004/0078695 A1 | 4/2004 | Bowers et al. |
| 2004/0123285 A1 | 6/2004 | Berg et al. |
| 2006/0106743 A1 | 5/2006 | Horvitz |
| 2006/0116981 A1 | 6/2006 | Krimmel et al. |
| 2006/0129606 A1 | 6/2006 | Horvitz et al. |
| 2006/0282471 A1 | 12/2006 | Mark et al. |
| 2007/0005761 A1 | 1/2007 | Wolters |
| 2008/0250497 A1 * | 10/2008 | Mullarkey et al. .............. 726/22 |
| 2009/0125758 A1 | 5/2009 | Anuszczyk et al. |
| 2009/0313508 A1 * | 12/2009 | Yan et al. ........................ 714/47 |

* cited by examiner

|  | $P_1 - C_{13}$ | $P_2 - C_{32}$ | $P_3 - C_{12}$ | $P_4 - C_{41}$ |
|---|---|---|---|---|
| $S_1 - C_{11}$ | 0 | .1 | 0 | 0 |
| $S_1 - C_{32}$ | .3 | .2 | 0 | .3 |
| $S_2 - C_{22}$ | .5 | 0 | .1 | 0 |
| $S_3 - C_{13}$ | 0 | 0 | .6 | 0 |
| $S_3 - C_{22}$ | 0 | .8 | 0 | .4 |
| $S_4 - C_{11}$ | 0 | 0 | 0 | .3 |
| $S_4 - C_{21}$ | .2 | .2 | .4 | 0 |
| $S_5 - C_{31}$ | 0 | 0 | 1 | 0 |
| $S_6 - C_{51}$ | 0 | 0 | 0 | .1 |

B leads A:

| Fingerprint | tc=0 | tc=1 | tc=2 | tc=3 |
|---|---|---|---|---|
| A | r1, r2, r3 | r4, r5 | r1, r2 | |
| B | r4, r5 | r1, r2 | r3, r6 | r1, r2, r3 |

FIG. 9A

B lags A:

| Fingerprint | tc=0 | tc=1 | tc=2 | tc=3 |
|---|---|---|---|---|
| A | r1, r2, r3 | r4, r5 | r1, r2 | |
| B | r3, r6 | r1, r2, r3 | r4, r5 | r1, r2 |

FIG. 9B

No Shift:

| Fingerprint | tc=0 | tc=1 | tc=2 | tc=3 |
|---|---|---|---|---|
| A | r1, r2, r3 | r4, r5 | r1, r2 | |
| B | r1, r2, r3 | r4, r5 | r1, r2 | r3, r6 |

FIG. 9C

SYSTEM AND METHOD FOR CORRELATING FINGERPRINTS FOR AUTOMATED INTELLIGENCE

RELATED APPLICATIONS

The contents of this application are related to U.S. patent application Ser. No. 11/535,787, filed Sep. 27, 2006, entitled "System and Method for Generating and Using Fingerprints for Integrity Management," the contents of which are hereby incorporated by reference in its entirety.

TECHNICAL FIELD

This disclosure relates generally to the field of network monitoring systems and, more particularly, to a system and method for correlating problem fingerprints in a network environment for use in automated intelligence.

BACKGROUND

A network consists of two or more computers or other devices that are linked in order to share resources (such as databases, servers, printers, etc.), exchange files, or allow electronic communications. The computers on a network may be linked together through a communication medium, such as cables, telephone lines, radio waves, satellites, or infrared light beams. There are many types of computer networks, including local-area networks (LANs), wide-area networks (WANs), campus-area networks (CANs), metropolitan-area networks (MANs) and home-area networks (HANs). Networks are used to communicate between devices, such as via e-mail, and to provide access to resources stored on another device, such as a server.

Most organizations possess an Information Technology (IT) infrastructure comprising the computerized networks, intelligent terminals, and accompanying applications and services people use to access, create, disseminate, and utilize digital information. The IT infrastructure also includes the equipment, software, services, and products used in storing, processing, transmitting, and displaying all forms of information. Organizations are increasingly dependent on their IT infrastructure for all of their essential business processes, which often depend on software, hardware, networks and data systems working together with full integrity to provide business functionality to external and internal users alike. Increasingly, "online" business processes are both critical to a company's well-being and based on distributed IT infrastructures of mounting complexity. The scope of this infrastructure might even extend beyond the organization's boundaries into the infrastructures of partners and providers of managed services.

IT infrastructures are typically not the centralized, well-understood operations characteristic of the days of mainframes, architected and tested as a whole down to the last possible race condition or anomaly. Instead, IT professionals must manage an application infrastructure that is a complex maze of loosely interconnected racks of servers, network components, and a multi-tiered stack of logical components including application servers, database servers, load balancers and the applications themselves. Each business process depends on a chain of components drawn from that maze, yet the components are only managed as one of a number of similar components in a rack, "farm," or other logical silo. The result is "affordable" computing power, but at the cost of difficult-to-manage (and thus costly) system behavior.

Network management is the process of managing the various network devices and network communication links in the IT infrastructure to provide the necessary network services to the users of the network. Typical network management systems collect information regarding the operation and performance of the network and analyze the collected information to detect problems in the network. Many companies have invested in tools that do a good job of helping technical experts monitor and manage each element or silo in the multi-tiered stack of physical and logical systems. But element monitoring falls short, because when something goes wrong in the dynamically interdependent overall system, there exists no manner of knowing which physical or logical component in which rack might be the cause. In fact, there typically is not a single cause, but rather some interaction of components that really creates the problem.

Element monitoring tools are currently used to attempt to identify problems occurring in the IT infrastructure. However, the element monitoring tools in wide use in enterprises today lack a holistic view and understanding of the interdependencies of the interconnected elements of the entire IT infrastructure.

SUMMARY

According to one or more embodiments, a system and method is provided for capturing and using problem fingerprints in an Information Technology (IT) infrastructure for use in automated intelligence. In one aspect, automated intelligence is a systems management paradigm that transforms raw metric data from a monitored infrastructure into actionable intelligence. In one or more embodiments, a comprehensive understanding of the interdependencies among all of the system components in an IT infrastructure is provided by analyzing the end-to-end metrics for events to pinpoint the problem elements in a transaction chain. In another aspect, the present system and method automatically captures a fingerprint of the transaction topology in an IT infrastructure at various time intervals prior to the occurrence of an event leading to a problem, such that the fingerprint provides an indication of the activity and operation of the IT infrastructure immediately preceding the problem event. The event triggering the capture of the fingerprint may be based on failures, hard threshold violations, defined transactions such as transaction slowdowns in the IT infrastructure, or user-provided occurrences.

In one or more embodiments, the system and method determine whether a correlation exists between two or more fingerprints to determine whether such fingerprints separately indicate the occurrence of a problem event for the same reason, or for at least some of the same reasons, based on a degree of match that is determined to exist between the rules sets of the fingerprints. If a correlation or degree of match is found to exist between the rule sets of two or more fingerprints, then it can be determined that the fingerprints indicate the occurrence of the problem event at least partially for the same reason based on the degree of match. For fingerprints that are determined to possess a certain degree of match or correlation, the rule sets for those fingerprints can be merged together with the probabilities that such rules will indicate the occurrence of the problem event adjusted accordingly. In one or more embodiments, the fingerprint matching correlation procedures are implemented to account for time or phase shifts that may exist between the rule sets in two fingerprints.

In one or more embodiments, the fingerprint is weighted and used to monitor IT infrastructure operation and activity to provide an indication of potential problems before the problems occur by matching real-time data on the IT infrastructure against the fingerprint to determine when the operation and activity on the IT infrastructure appears similar to activity that previously resulted in a problem event. When it is determined that there is sufficient probability that a problem event will occur based upon the real-time data matching a previously generated problem fingerprint, an alert is generated to provide sufficient notification prior to the occurrence of problem event. Based upon the comprehensive understanding of the interdependencies among all of the system components, the alert that is generated is able to specifically identify the root cause and location of the pending problem so that the alert can be delivered to a target audience. The captured problem fingerprint is device independent so that it can be applied to other transactions and devices in the IT infrastructure.

For purposes of summarizing the disclosure and the advantages achieved over the prior art, certain advantages of the disclosure have been described herein. Of course, it is to be understood that not necessarily all such advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other advantages as may be taught or suggested herein.

All of these embodiments are intended to be within the scope of the disclosure herein disclosed. These and other embodiments of the present disclosure will become readily apparent to those skilled in the art from the following detailed description of the preferred embodiments having reference to the attached figures, the disclosure not being limited to any particular preferred embodiment disclosed.

DRAWINGS

The above-mentioned features and objects of the present disclosure will become more apparent with reference to the following description taken in conjunction with the accompanying drawings wherein like reference numerals denote like elements and in which:

FIGS. 9A-9C are illustrations of possible shifts in time cuts that can exist between two fingerprints.

DETAILED DESCRIPTION

The present disclosure teaches a novel system and method for generating, correlating and using problem fingerprints in an Information Technology (IT) infrastructure for automated intelligence. Fingerprints are developed using a comprehensive understanding of the interdependencies among all of the system components in an IT infrastructure by analyzing the end-to-end metrics and events to pinpoint the problem elements in a transaction chain. In one aspect, the present system and method automatically captures a fingerprint of the transaction topology in an IT infrastructure at various time intervals prior to the occurrence of an event leading to a problem, such that the fingerprint provides an indication of the activity and operation of the IT infrastructure immediately preceding the problem event. The event triggering the capture of the fingerprint may be based on failures, hard threshold violations, defined transactions such as transaction slowdowns in the IT infrastructure, or user-provided occurrences.

For the purposes of this disclosure, the following terms shall be understood to possess the following meaning associated therewith:

Event: a condition that indicates an abnormal behavior in a device or a transaction (Event=Symptom+device+generation time+other information).

Symptom: the actual metric and the reason an event was generated not associated with a device or transaction (Symptom=Metric+Event Reason).

Metric: the atomic being measured on a device or a transaction, where an atomic may include any fundamental entity within a system which can be measured. A metric can consist of multiple sub items (e.g. Metric=Name+Type+SubType).

Rule: a single element describing the probability of a symptom (occurring for a given tier group and subgroup) for a specific time cut. (Rule=Time Cut+Symptom+Tier Group+Tier Subgroup+Weight).

Fingerprint: a set of rules associated with a specific tier group, tier subgroup and transaction.

Transaction: a grouping of devices within a hierarchical model consisting of tier groups and subgroups. Each device will belong to a particular tier group and tier subgroup.

Tier Group: a column within a transaction hierarchy which has a unique label (identified by the user) that separates the functionality performed by the devices within that tier group from other tier groups.

Tier Subgroup: a sub-categorization of a tier group into multiple subgroups, where the devices within a tier group can be sub-categorized based on specific functionality performed by those devices.

Alert: an event that has gone through the fingerprint process and has been identified as necessitating notification of a potential problem.

Time Cut: an integer number indicating the number of time units prior to the occurrence of a problem (the problem occurs at time cut 0). The unit time is determined by a predetermined time unit (e.g., minutes) per time cut user input.

Fingerprint Generation

Figure 1:
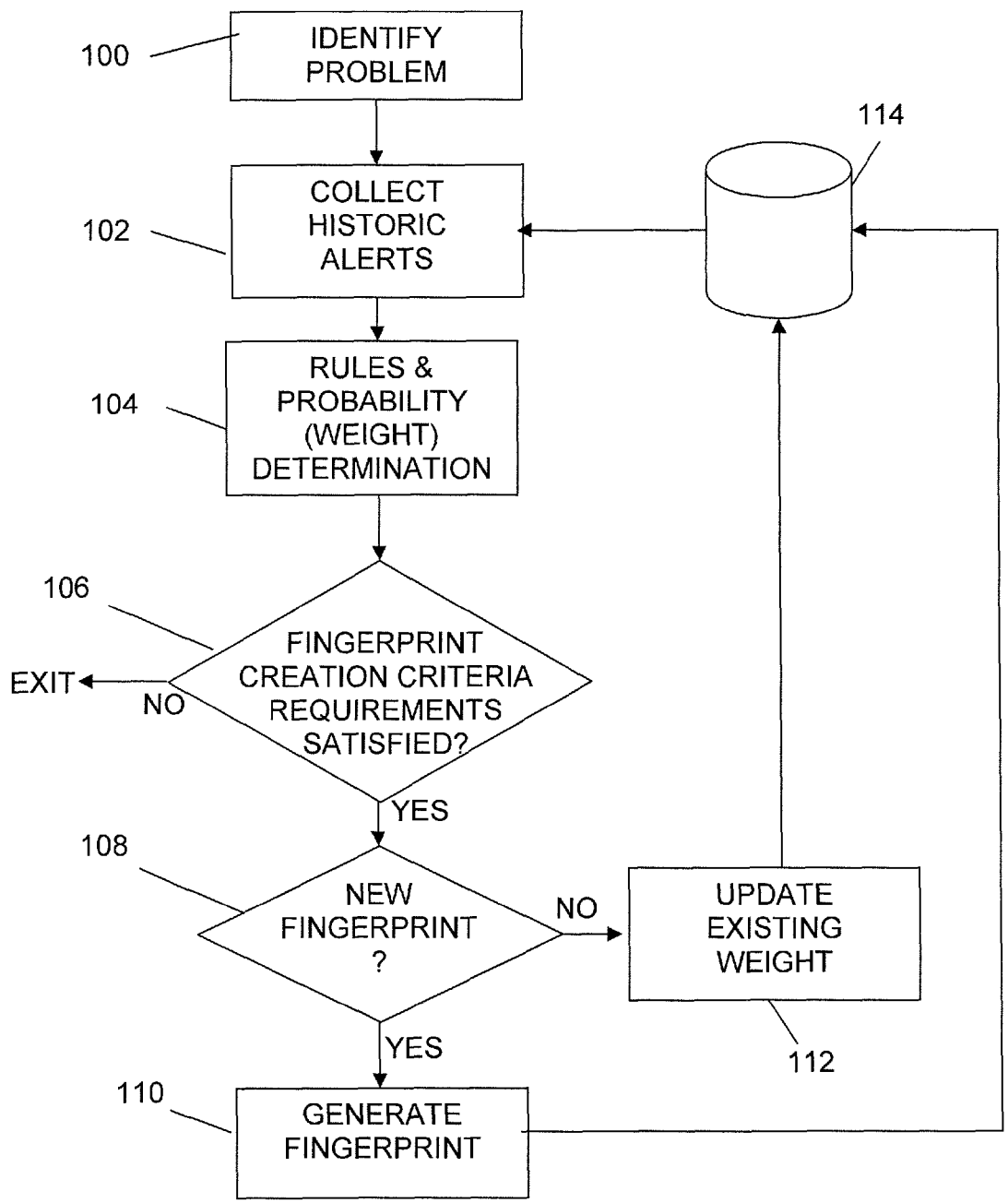
FIG. 1 is a flow diagram of a method for generating fingerprints in accordance with one or more embodiments of the present disclosure.

Referring now to FIG. 1, an operational flow diagram for one embodiment of a method of capturing a fingerprint of a problem in information technology (IT) infrastructure is illustrated. Initially, a problem in the IT infrastructure is identified in operation 100. In one aspect, the problem is identified by identifying at least one of a failure, a hard threshold violation, a defined transaction or a user-identified occurrence in at least one device and/or transaction in the IT infrastructure. In a further aspect, the defined transaction identifying the problem may be a function of a dynamic thresholding calculation that is performed on a metric in the IT infrastructure. One such method of performing dynamic thresholding calculations is described in U.S. patent application Ser. No. 11/535,818 entitled, "Self-Learning Integrity Management System and Related Methods," filed on Sep. 27, 2006 and assigned to the same assignee as the present application, the contents of which are hereby incorporated by reference in its entirety. By way of example, one such dynamic thresholding determination may include a determination of a transaction slowdown on the IT infrastructure.

Figure 2:
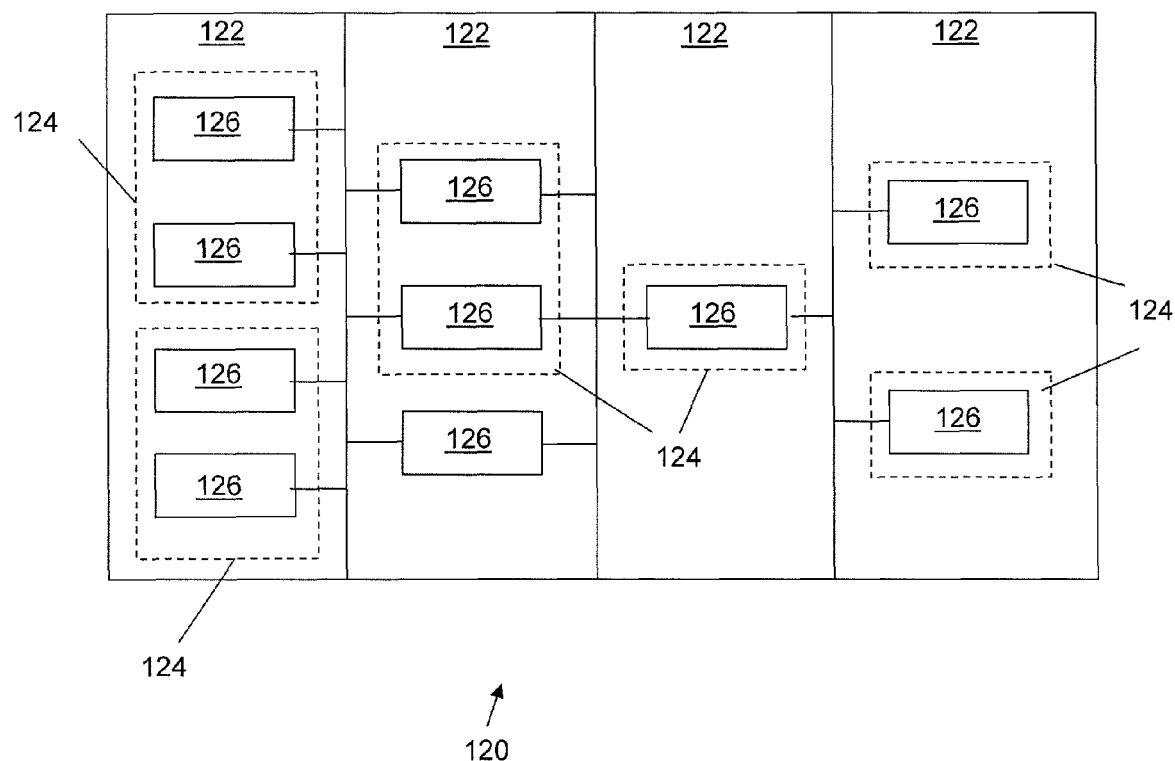
FIG. 2 is a representative transaction topology in accordance with one or more embodiments of the present disclosure.

After a problem has been identified, information related to the problem is collected in operation 102. In one aspect, the collected information includes identifying the device(s) in the IT infrastructure where the problem is originating, where a group of devices in a transaction topology in the IT infrastructure that includes the identified problem device is also determined. Referring to the illustration of one embodiment of a transaction topology shown in FIG. 2, a transaction topology 120 of a multi-tier transaction may include a plurality of tier groups 122 that are respectively defined by the functions performed by the devices 126 in that tier group 122. For example, the different tier groups 122 could respectively identify an application server, a database server, an email server, a Citrix presentation server, etc. Each tier group 122 is preferably unique when identifying the transaction topology. A tier group may include at least one tier subgroup 124 that is a sub-grouping of devices 126 in a tier group 122. As will be described herein below, when a fingerprint match is made and a problem is predicted to occur in the IT infrastructure, the identification of the location where the problem will be occurring preferably identifies the particular tier group 122 and the tier subgroup 124 in order to pinpoint the problem.

Further information collected in operation 102 will include how far back in time the system and method should look when analyzing the activity of the IT infrastructure that led up to the occurrence of the problem by determining a number of time cuts for which to obtain information and a time interval for such time cuts. All transactions within the group of devices that involve the problem device are also identified and, for a given time cut, a set of all events for the identified transactions are collected.

With reference back to FIG. 1, once the information related to the problem has been collected, a set of rules are created for the problem in operation 104. Probabilities or weights are determined and assigned to each of the rules, as will be described in greater detail below, such that a rule describes the probability of a symptom occurring for a given group of devices will indicate a problem fingerprint for a given time cut. The collective set of rules that are created for a given problem will represent the fingerprint for such problem. A determination is made in operation 106 if the number of rules in the collected set of rules meets a certain threshold number of rules that are required to be satisfied to satisfy the fingerprint creation criteria. If the number of rules falls below the certain threshold, then it is determined that not enough data exists to generate a fingerprint and the fingerprint generation process is exited. If the number of rules describing the fingerprint meets the threshold number, then it is determined that there is enough information to create a viable fingerprint for the problem. It is then determined in operation 108 whether the fingerprint is new or whether a fingerprint already exists for the given transaction and group of devices. If the fingerprint is new, a new fingerprint is generated by operation 110 and then stored in a system database 114. If the fingerprint is already in existence, then the weights in the existing fingerprint are updated with the values in the newly generated fingerprint in operation 112, where the updated fingerprint is then stored in database 114.

In one aspect, the fingerprint generation process can be represented mathematically according to following equations.

$R_{ji}$=Symptom+Tier Group+Tier Subgroup+Weight, for the j-th rule and the i-th Time Cut, $N_R(tc_i)$=the total number of rules for time cut $i$, and $C_{ij}$=the j-th subgroup in i-th tier group, for a rule R, a number of rules N, and a tier group and tier subgroup C.

In one embodiment, the input to the system and method for capturing the fingerprints may include:
a. The device where the problem is originating ($d_o$)
b. The tier group and subgroup of problem origination ($C_{lm}$)
c. The time interval in time cuts ($tc_i$)
d. Number of time cuts ($t_N$)
e. Problem start time (tp)

All transactions containing the problem device $d_o$ are obtained within the tier group and subgroup of problem origination ($C_{lm}$), where this set of transactions is referred to as $T_{do}$. For the i-th time cut, the system and method obtains the set of all events, calculates the corresponding weights and constructs the set of rules $R_{ji}$ for the problem. If the number of rules $N_R(tc_i)$ describing the fingerprint is equal to or above some specified number $N_R$, then there is a viable fingerprint $F_P$, which will be unique for a given transaction $T_K$ and tier group and subgroup of problem origination $C_{lm}$, which can be represented by the following equation:

$$F_P = [[R_{ji}|_{j=0}^{N_R(tc_i)}, tc_i, tp, C_{lm}, T_k \in T_{d_0}]_{i=0}^{N-1}$$

Rule Weight Determination

When probability weights are assigned to each rule, the assignment of weights to rules will take into account several variables. In one aspect, these variables include the particular time cut in which the symptom observed, whether the rule is a new rule or existing rule, whether the probability assigned is high enough to accept the rule, what fraction of devices within the tier group and subgroup contain the symptom, etc.

In one aspect, a rule weight (W) can be represented by the equation:

$$W = (W^{base})(\gamma)\left(\frac{N_S}{N_D}\right)(R_W^{tc_i})$$

where, $W^{base}$=Base weight factor for new rules, where $0 < W^{base} < 1$.

$R_W$=Reduction factor for existing fingerprint rules that are not repeated when a fingerprint is recaptured, where $0<R_W<1$.

$W^{min}$=Minimum weight allowed for a rule, where a rule is removed from the fingerprint if the rule weight falls below this level, further where $0<W^{min}<1$.

$\gamma$=factor to correct for whether the symptom is from the tier group-subgroup ($C_{ij}$) of where the problem is coming from, where $$\gamma = \begin{cases} \alpha & C_{ij} = C_{lm} \\ \beta & C_{ij} \neq C_{lm} \end{cases} \alpha > \beta \; 0 < \alpha, \beta < 1$$

$N_D$=number of devices within a specified tier group.

$N_S$=number of devices exhibiting symptom S within a specified tier group.

$tc_i$=number of the time cut.

As can be seen from the equations, as the time cut $tc_i$ increases (noting that the time domain is moving further away from the problem origination time), there is a reduction in weight probability.

For existing fingerprints, if a newly obtained rule exists within the fingerprint for the specified time cut $tc_i$, then the weight (W) for that rule is increased in the fingerprint. For example, the weight can be increased according to the following equation:

$$W = \frac{a + bW}{a + b}$$

which will linearly scale W towards a maximum value of 1.0

If at the specified time cut $tc_i$, an existing rule in the fingerprint is not part of the newly generated rules, then the probability of the existing rule is reduced. For example, the weight can be reduced according to the following equation:

$$W = W \cdot R_W$$

Any rule having a weight (W) that is reduced that falls below the minimum rule weight $W_{min}$ is eliminated from that fingerprint for the specified time cut $tc_i$.

Fingerprint Correlation

Figure 8:
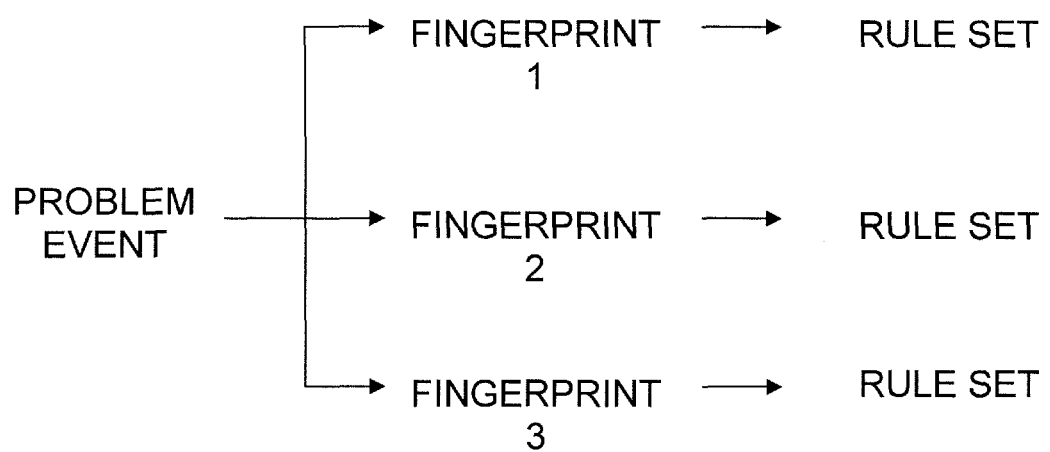
FIG. 8 is a representation of a plurality of fingerprints, each with their own respective rule sets, that can be associated with a problem event.

In one or more embodiments, a problem event may be represented and/or associated with a plurality of fingerprints that have been generated. Each fingerprint is essentially a different reason for the occurrence of a problem event. As such, a problem event may occur for a plurality of possible reasons. Referring now to FIG. 8, by way of example, a problem event may be associated with various fingerprints (e.g., Fingerprints 1-3 illustrated in FIG. 8) that have been generated that provide reasons for the occurrence of the problem event. Each fingerprint includes its own set of rules at various time cuts $tc_i$ that each have an associated probability or weight (W). Thus, the set of time cuts, rules and probabilities associated with each fingerprint may be stored separately from the other fingerprints. In actuality, a correlation may exist with respect to two or more fingerprints, such that the fingerprints may indicate the occurrence of the same problem event for at least some, if not all, of the same reasons.

Thus, in one or more embodiments, a system and method are provided for correlating fingerprints for use in automated intelligence. If a correlation or degree of match is found to exist between the rule sets of two or more fingerprints, then it can be determined that the fingerprints indicate the occurrence of the problem event for the same reason, for substantially the same reason or for at least some of the same reasons, based on the degree of match between the rule sets. For fingerprints that are determined to possess a certain degree of match or correlation, the rule sets for those fingerprints can be merged and the probabilities or Weights of the merged rules adjusted accordingly.

Each of the rules in a rule set of a fingerprint is associated with a particular time cut $tc_i$. It is possible for one fingerprint to include a set of rules that indicate that a problem event is occurring for a particular reason at particular corresponding time cuts while another fingerprint may include a similar set of rules that indicate that the same problem event is occurring for the same reason only at different corresponding time cuts. This can occur because deviations can exist with respect to when problem events are first identified to initiate the generation of a fingerprint. Thus, two fingerprints may at first glance appear to indicate that a problem event is occurring for different reasons because the rules associated with each fingerprint are different in some or all of the same time cuts. However, in actuality, the two fingerprints may be shifted in time with respect to each other such that the rule set for both fingerprints have a certain degree of correlation, only shifted in time. For example, referring to FIGS. 9A-9C, a number of representative examples are set forth illustrating the manner in which two fingerprints, A and B, may have rule sets that are strongly correlated to each other, only shifted in time. In FIG. 9A, fingerprint B is shown to be leading fingerprint A in time. It can be seen that if the rules for fingerprint A in each of the time cuts $tc_i$ were shifted in time to the left to the next previously occurring time cut, then the rules for each of the fingerprints A and B would match across the same time cut $tc_i$. In FIG. 9B, fingerprint B is shown to be lagging fingerprint A in time. It can be seen that if the rules for fingerprint A in each of the time cuts $tc_i$ were shifted in time to the right to the next later occurring time cut, then the rules for each of the fingerprints A and B would match across the same time cut $tc_i$. In FIG. 9C, there is no shift with respect to fingerprint A and B and it can be seen that the rules are the same across many of the same time cuts $tc_i$ for both fingerprints A and B.

Figure 10:
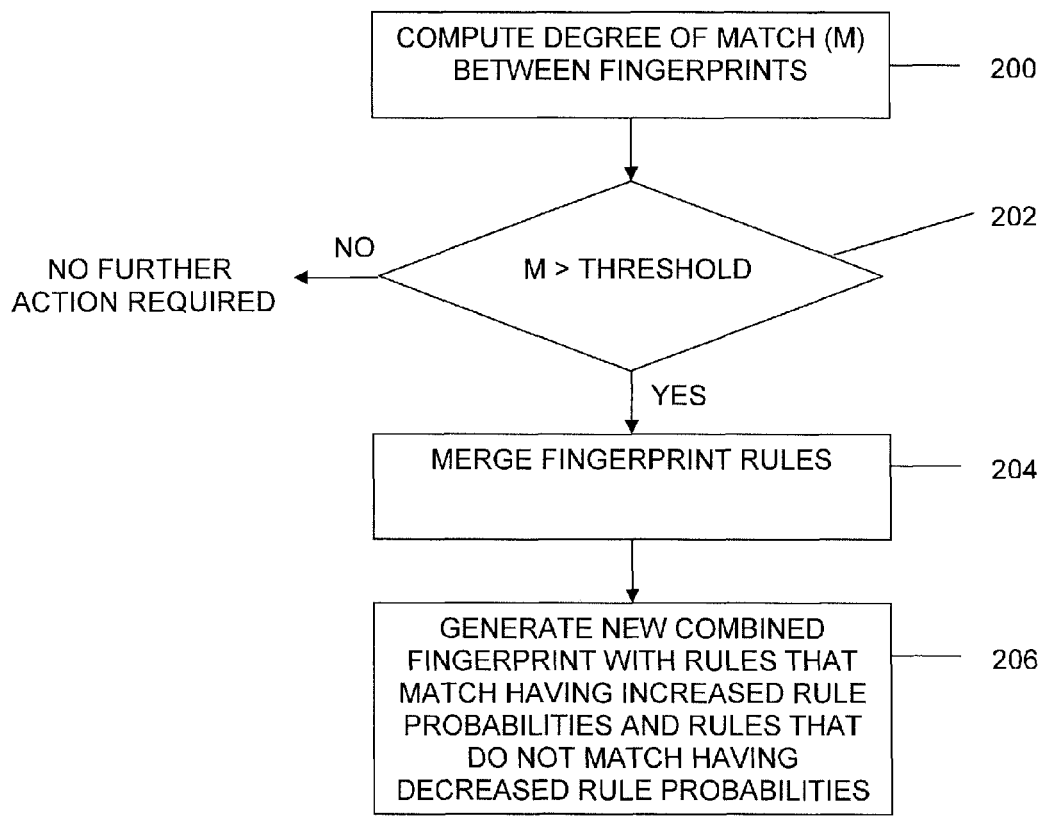
FIG. 10 is an operation flow diagram of a method of correlating fingerprints in accordance with one or more embodiments of the present disclosure.

Referring now to FIG. 10, an operational flow diagram for one or more embodiments of a method of correlating fingerprints is illustrated. Initially, a degree of match M between two fingerprints is computed in operation 200 to determine if the two fingerprints indicate the occurrence of the problem event at least partially for the same reason. In one or more embodiments, to account for the possibility that two fingerprints could possess rule sets that have some degree of correlation only shifted in time, the degree of match M operation 200 iteratively shifts the two fingerprints with respect to each other in time and computes the degree of match M between the two fingerprints at each time shift. In some embodiments, the degree of match M will be a value between 0 and 1. From the computations at the various time shifts, the maximum value of the degree of match M across all of the time shifts is determined, where the time shift associated with the maximum degree of match M is determined to be the shift (S) or phase between the two fingerprints for a maximum degree of match.

The degree of match M at this shift (S) associated with the maximum value is then compared against a certain threshold value in operation 202 to determine if the two fingerprints have a high enough correlation to indicate that the two fingerprints are indicating the occurrence of the problem event for the same reason, substantially the same reason or at least some of the same reasons. The threshold value may be variably selected by a user based on the desired performance of the automated intelligence procedures being implemented. By way of example only, the threshold value could be selected to be 0.75 thereby indicating that at least ¾ of the rule sets for the two fingerprints must match for the two fingerprints to be considered to be indicating the occurrence of the problem event for the same reason.

If the degree of match M exceeds the threshold value, the two fingerprints are merged in operation 204 into a single combined fingerprint. The probabilities or Weight (W) of the merged rules are then updated in operation 206 by increasing the probability of the rules in the merged fingerprint that were determined to correlate between the two compared fingerprints. Those rules in the merged fingerprint that did not correlate between the two fingerprints have their respective probabilities decreased in the resulting merged fingerprint in operation 206. Similarly, if the degree of match M between the two fingerprints did not reach the requisite threshold, then it is determined that the two fingerprints do not sufficiently correlate to each other and thus no further action is required. In this manner, multiple fingerprints that really indicate that a problem event is occurring at least partially for the same reason are merged into a single fingerprint associated with that reason. This process can be repeated where the merged fingerprint can be compared against additional fingerprints to determine if the additional fingerprints similarly are associated with the same reason for why a problem event is occurring.

In one or more embodiments, the degree of match M between two fingerprints A and B is computed according to the following equation:

$$M \equiv \frac{\sum_{i=0}^{k} m_i f_i}{\sum_{i=0}^{k} \min(|A_l|, |B_j|)} f_t$$

where:
$A_i$≡Set of rules for fingerprint A at time cut i,
$B_i$≡Set of rules for fingerprint B at time cut i
|D|≡Cardinality of set D (number of elements in set D), for example A={$A_0, A_1, A_2$} where $A_1$={$r_4, r_5$}, then |A|=3 and |$A_1$|=2
S≡Shift of fingerprint A relative to fingerprint B (phase). If fingerprint A is shifted to the right of fingerprint B (B leads A) then S>0. If fingerprint A is shifted to the left of fingerprint B (B lags A) the S<0. If there is no shift between fingerprints A and B, S=0.
$m_i$≡The number of rules that matched between fingerprints $A_i$ and $B_i$ $$k \equiv \min(|A|, |B|) - 1$$

$$j \equiv \begin{cases} i+S & 0 \le i+S < |B| \text{ and } S > 0 \\ i & S \le 0 \\ N/A & \text{Otherwise} \end{cases}$$

$$l \equiv \begin{cases} i+S & 0 \le i+S < |A| \text{ and } S < 0 \\ i & S \ge 0 \\ N/A & \text{Otherwise} \end{cases}$$

For $l = N/A$ and $j = N/A$ $m_i \equiv 0$.

Figure 11:
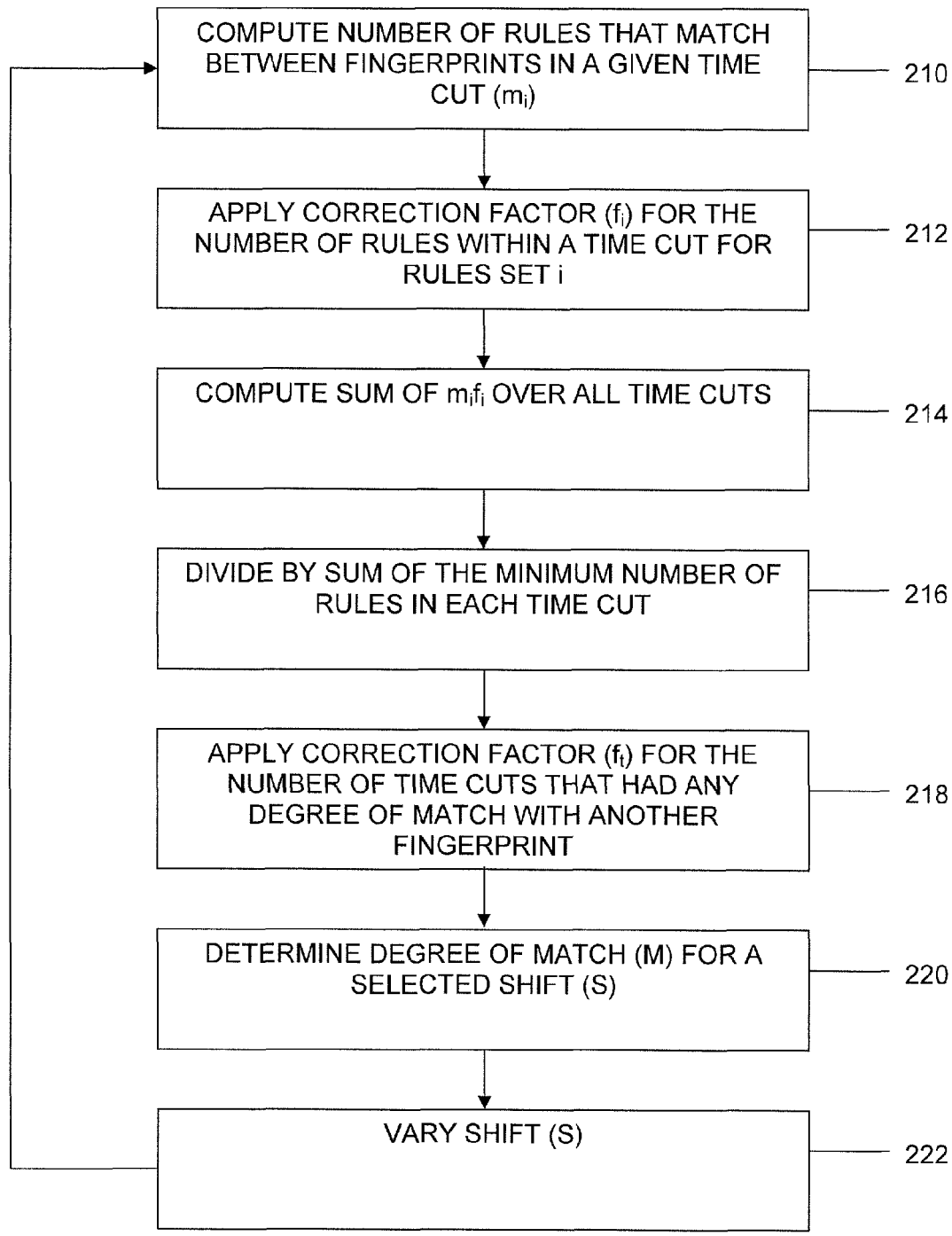
FIG. 11 is an operation flow diagram of a method of computing a degree of match between rule sets in fingerprints in accordance with one or more embodiments of the present disclosure.

Referring now to FIG. 11, an operational flow diagram for one or more embodiments of computing the degree of match M is illustrated with further reference to the above equations. Initially, a certain value for the shift S is selected and, for a given time cut $tc_i$, the number of rules that matched $m_i$ between $A_i$ and $B_i$ is determined in operation 210. A correction factor $f_i$ is then applied to $m_i$ in operation 212 for the number of rules within a time cut $tc_i$, to account for the number of rules on a per time cut basis to ensure an accurate degree of match M is rendered, where $f_i$ can be represented by the following equation:

$$f_i \equiv \frac{\ln(\min(|A_i|, |B_i|))}{\ln(H)}$$

where H indicates the minimum number of rules below which a correction factor $f_i$ must be applied, further where H can be variably specified or selected by a user depending upon the preferred operation of the present method. Further, if $\min(|A_i|, |B_i|) > H$, then $f_i \equiv 1$.

The number of rules that matched $m_i$ between $A_i$ and $B_i$ is determined for each of the time cuts $tc_i$ with an appropriate correction factor $f_i$ being applied to a corresponding $m_i$ for each time cut $tc_i$, where the sum of $m_i f_i$ over all of the time cuts $$\left( \sum_{i=0}^{k} m_i f_i \right)$$

is computed in operation 214. This value is then divided in operation 216 by the composite sum of the minimum number of rules between fingerprints A and B in each compared time cut $$(\sum_{i=0}^{k} \min(|A_l|, |B_j|)).$$

A correction factor $f_t$ is then applied in operation 218 to correct for the number of time cuts between fingerprints A and B that had rules with any degree of match. Thus, correction factor $f_t$ corrects for the situation where few (if any) time cuts actually had matching rules between the fingerprints. For example, if 3 time cuts had rules that matched between fingerprints A and B while a $4^{th}$ time cut did not possess any matching rules, the degree of match between fingerprints A and B must be corrected so that it can be appropriately compared against another pair of fingerprints that may have all four time cuts including matching rules.

The degree of match M is then determined from the above equations for the selected shift S in operation 220. The value of the shift S is then varied in operation 222 and each of the operations 210-220 are repeated to compute the degree of match M for the new shift value. These operations are repeated until a degree of match M has been computed for all possible shift values S between the two fingerprints A and B. From the computations at the various possible time shifts S, a determination is made of the maximum value for the degree of match M for a certain shift (S) or phase between the two fingerprints for a maximum degree of match M. If this maximum degree of match M is greater than a specified threshold value, the fingerprints are determined to be indicating that a problem event is being caused by the same reason and the fingerprints are merged together.

By way of example, considering the fingerprints A and B illustrated in FIG. 9A where fingerprint B leads fingerprint A by one time cut, the shift S=1 and the H=4. Then, the following values appearing in the table below would result for this specific example:

$|A_0| = 3$  $|B_1| = 2$  $m_0 = 2$
$|A_1| = 2$  $|B_2| = 2$  $m_1 = 0$
$|A_2| = 2$  $|B_3| = 2$  $m_2 = 1$ where, $$f_0 = \frac{\ln(2)}{\ln(4)} \quad f_1 = \frac{\ln(2)}{\ln(4)} \quad f_2 = \frac{\ln(2)}{\ln(4)},$$

$l = i$,
$j = 1 + 1$, and
$f_t = 0.9$.

In one or more embodiments, when merging two fingerprints together, a decision must be made regarding how many time cuts $tc_i$ will remain in the merged fingerprint, especially when the shift $S \neq 0$ and/or $|A| \neq |B|$. Thus, in one or more embodiments, for a merged fingerprint D that represents the merger of fingerprints A and B, the merged fingerprint D and number of time cuts ($t_{cm}$) in the merged fingerprint D can be determined from the following equations:

$$t_{cm} \equiv |A| \quad \text{for } S = 0$$

$$t_{cm} \equiv \begin{Bmatrix} |A| & |A| \leq |B| \\ |B| + S & |B| < |A| \end{Bmatrix} \text{ for } S < 0$$

$$t_{cm} \equiv \begin{Bmatrix} |A| + S & |A| < |B| \\ |B| & |B| \leq |A| \end{Bmatrix} \text{ for } S > 0$$

where $t_{cm} = |D|$, $\Gamma \equiv$ merge operator ($\Gamma(A_l, B_j)$ merges $A_l$ and $B_j$), $D_i \equiv \Gamma(A_l, B_j)$, and $$l \equiv \begin{Bmatrix} i & S \leq 0 \\ i - S & S > 0 \end{Bmatrix}$$

$$j \equiv \begin{Bmatrix} i + S & S < 0 \\ i & S \geq 0 \end{Bmatrix}$$

If l<0 then $A_l$=Ørepresenting an empty set (i.e. no rules). If j<0 then $B_j$Ø.

In one or more embodiments, each of the fingerprints comprises a set of rules (e.g., $\text{Rule}_{An}$ for fingerprint A) with associated probabilities (e.g., $P_{An}$) over a set of time cuts, as represented by the following representative example equations:

$A_i = \{r_{A1}, r_{A2}, r_{A3}, \ldots\}$ $B_j = \{r_{B1}, r_{B2}, r_{B3}, \ldots\}$ $r_{An} = \{\text{Rule}_{An}, P_{An}\}$ where $r_{An}$ is the nth doublet of $\text{Rule}_{An}$ plus probability $P_{An}$ for fingerprint A. The operation $\Gamma(A_i, B_j)$ consists of comparing $r_{An}$ to all rule doublets of $B_j$ looking for a match of the rules as described herein. If, for example, $\text{Rule}_{An}$ were found to match $\text{Rule}_{Bn}$, then a new entry for the merged fingerprint is created for $D_i$ consisting of the doublet:

$$r_{Dn} \equiv \left\{ \text{Rule}_{An}, \frac{1}{4}(1 + 3 * \max(P_{An}, P_{Bm})) \right\}$$

As can seen from this equation, the probability of $\text{Rule}_{An}$ is thus increased in the merged fingerprint based on the degree of match that was found to exist for this rule between fingerprints A and B.

If for $\text{Rule}_{An+1}$ there is no match in $B_j$ then the probability of this rule is decreased, such as by the following calculation $P_{An+1} = P_{An+1} * r_f$ where $r_f$ is a reduction factor have a value less than one. If the new probability for $P_{An+1}$ is greater than some desired or specified minimum probability, then an updated value for the fingerprint can be created for $D_i$ to account for this adjusted probability as follows:

$r_{Dn+1} = \{\text{Rule}_{An+1}, P_{An+1}\}$

In one or more embodiments, if the new probability for $P_{An+1}$ is below than some desired or specified minimum probability, then the updated value for the fingerprint is not created and this rule is eliminated from the fingerprint because it is determined to not possess sufficient significance to the indication of the problem event.

Fingerprint Matching

In one or more embodiments, a fingerprint matching process is implemented in which a fingerprint is used to monitor IT infrastructure operation and activity to provide an indication of a pending problem before the problem occurs by matching real-time data on the IT infrastructure against the problem fingerprint to determine when the operation and activity on the IT infrastructure appears similar to activity that previously resulted in a problem event. The fingerprint may be generated from the above-described fingerprint generation process or may otherwise be input by another source into the fingerprint matching process. When it is determined that there is sufficient probability a problem event will occur based upon the real-time data matching a previously generated problem fingerprint, an alert is generated to provide sufficient notification prior to the occurrence of problem event. Based upon the comprehensive understanding of the interdependencies among all of the system components, the alert that is generated is able to specifically identify the root cause and location of the pending problem down to the tier group and subgroup so that a targeted alert can reach the relevant audience. This provides a substantial improvement over prior "blanket" alerts that would be provided to a network supervisor whenever any type of error occurred in a system, leaving the network supervisor to figure out the cause and location of the error.

Figure 3:
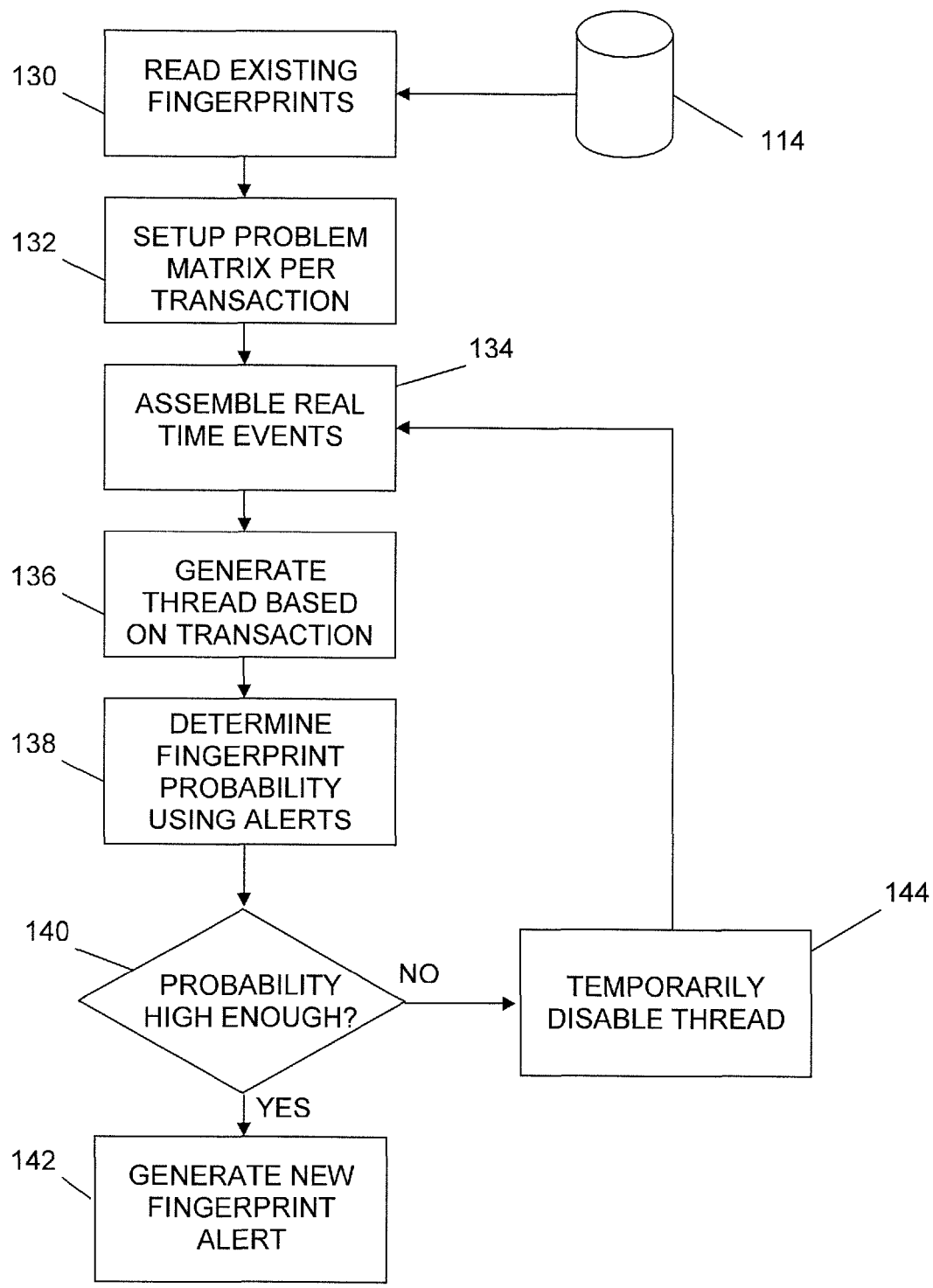
FIG. 3 is a flow diagram of a method for matching fingerprints in accordance with one or more embodiments of the present disclosure.

A fingerprint represents a stateless, device independent and metric-less entity that can be applied back to the relevant transaction to predict pending problems in real-time before such problems occur. This process will be referred to herein as fingerprint matching and one embodiment of which is illustrated in the operation flow diagram of FIG. 3.

Initially, the existing fingerprints are read out of the database 114 in operation 130 to obtain a set of all fingerprints (F) that apply to a transaction (T) and tier group and subgroup $C_{ij}$. For every transaction, a symptom-problem matrix is created in operation 132, wherein this matrix will be referred to hereinafter as the problem matrix. The problem matrix is created by obtaining the set of all rules from the definition of the fingerprint f ∈ F for a given time cut $tc_i$. Each set of rules for each fingerprint f will populate a portion of the problem matrix, such that entire problem matrix is populated in this manner for the entire set of all fingerprints (F) that apply to a transaction T and tier group and subgroup $C_{ij}$. After the problem matrix has been completed for the entire set of all fingerprints (F), the problem matrix is normalized by ensuring that for problems for which symptom-tier group information does not exist a weight of zero is assigned, thus ensuring a N×M matrix.

Figures 4A, 4B:
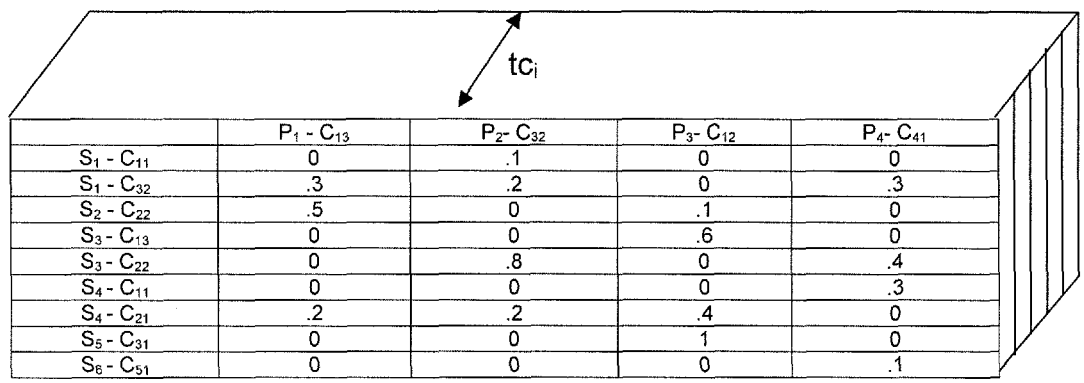
FIGS. 4A-4B illustrate representative problem matrices in accordance with one or more embodiments of the present disclosure.

By way of example, the problem matrix may appear as the two dimensional matrix illustrated in FIG. 4A for a specific time cut $tc_i$. The top row contains the headers for the respective columns of the problem matrix, where $P_k$-$C_{ij}$ indicates k-th problem for i-th tier group and j-th tier subgroup. The first column contains the headers for the respective rows of the problem matrix, where $S_m$-$C_{ij}$ indicates the m-th symptom for i-th tier group and j-th tier subgroup. This matrix for a specific time cut is two dimensional, such that the complete problem matrix taken across every time cut is a three dimensional matrix, as illustrated in FIG. 4B. The three dimensional problem matrix M (P, S, $tc_i$) can be designed as a function of the problem column P, the symptom row S and the time cuts $tc_i$.

With reference back to FIG. 3, once the problem matrix is obtained, the fingerprint matching process assembles real time events in operation 134 that involve the devices that are identified in the rules in the problem matrix.

Once the problem matrix M (P, S, $tc_i$) is obtained, it is used in one embodiment to identify the most probable problem (i.e., fingerprint) with respect to the incoming event stream. In this embodiment, the procedure for identifying a problem from the incoming events is described by the following operations. When an event is detected for a device $d_o$, the set of all transactions $T_{do}$ involving this device are obtained along with the set of all devices D that are part of all transactions $T_{do}$. A separate thread is generated by operation 136 to observe at least a portion of the events for the set of devices D. At predetermined intervals, the thread is activated to determine fingerprint probability in operation 138 by comparing a new set of events against the problem matrix. A determination is made by operation 140 whether the probability that the symptom-tier group information indicates the specified problem by determining whether the probability meets a certain threshold, where the threshold is either determined or selected to provide a cutoff point for only those problems with a high enough probability indication of a pending problem to merit alerting a user of the pending problem. If the probability does not meet the threshold, then the thread is temporarily disabled for a period of time by operation 144 until the process returns to operation 134 to begin assembling monitoring real time events again at some later point in time. If the probability exceeds the threshold, then a problem fingerprint matching alert is generated by operation 142. This alert can serve many purposes, including but not limited to notifying a user of the pending problem along with an indication of location (tier group and subgroup) where the problem occur and at what time the problem will likely occur. The alert may also be used to institute some degree of corrective measures to prevent the problem from ever occurring.

In one embodiment, the real-time probability determination is made using the problem matrix by comparing it against the new set of events in the generated thread. For a given transaction $T \in T_{do}$, the set of all devices $D_T \subseteq D$ in T is obtained, and for $d \in D_T$, the set $E_d$ of all events corresponding to device d are obtained. For every $C_{ij}$ in T, the total number of devices $n_{ij}$ is obtained in addition to the number of devices $m_{ij}$ exhibiting the symptoms $S_k$. A 1×M matrix column N(S) is then constructed consisting of the values $m_{ij}/n_{ij}$ illustrating the fraction of devices exhibiting particular symptoms. For example, the 1×M matrix column could appear similar to the following:

| | |
|---|---|
| $S_1$-$C_{11}$ | 1.0 |
| $S_1$-$C_{32}$ | 0 |
| $S_2$-$C_{22}$ | 0.5 |
| $S_3$-$C_{13}$ | 0.42 |
| $S_3$-$C_{22}$ | 1.0 |
| $S_4$-$C_{11}$ | 0 |
| $S_4$-$C_{21}$ | 0.1 |
| $S_5$-$C_{31}$ | 0 |
| $S_6$-$C_{51}$ | 0 |

The columns in the above matrix correspond to respective columns in the problem matrix of the transaction. Any symptom-tier information combination outside of this matrix is irrelevant as it does not indicate any known problems. Every column in the transaction matrix (representing one problem) is multiplied by the above 1×M column matrix N(S). It should be noted that this is not a matrix multiplication operation; but rather a straight element to element multiplication operation. This operation is performed for every column of the matrix for all Time Cuts $tc_i$.

$$H(P,S,tc_i) = M(P,S,tc_i) \times N(S)$$

The maximum fractional difference between the columns of the H matrix and the M matrix is then computed:

$$f_r(P, tc_i) = \frac{\sum_{\forall S} H(P, S, tc_i)}{\sum_{\forall S} M(P, S, tc_i)}$$

The fractional difference then needs to be scaled with respect to the total weights of the symptoms, time cut, and the number of available symptoms for the specified problem:

$$f_{total}(P,tc_i) = (f_r(P,tc_i)f_w(W_T) - f_t(tc_i))f_s(tc_i) + c$$

Where:

$$W_T = \sum_{\forall S} M(P, S, tc_i)$$

The equation representing the calculation of $f_{total}$ includes several correction factors that need to be applied to $f_r(P,tc_i)$ to obtain the true probability for the fingerprint. The correction function $f_w(W_T)$ compensates for the lack of high weight rules. If there are a series of low weight rules that make up the fingerprint then $f_r(P,tc_i)$ needs to be lowered to compensate for that fact. The correction function $f_t(tc_i)$ sets a minimum threshold for probability at any time cut. Thus, as the Time Cut is increased, the total probability is reduced since the further out in time from the problem the lower the probability of those events indicate a fingerprint. The correction function $f_s(tc_i)$ is the scaling factor for the number of symptoms indicating a fingerprint. This provides a check for high probability columns that have very few symptoms. The higher the number of symptoms, the more probable that the symptoms accurately represent the problem. Thus, if very few symptoms exist, then the probability is scaled down due to the low probability that the problem can be indicated by these few symptoms. The constant c ensures that the total probability ranges between zero and one.

For problem P, the largest value for $f_{Total}(P, tc_i)$ is selected:

$$f_{Total}(P) = \text{Max}\{f_{Total}(P, tc_i)\}$$

If $f_{Total}(P) > f_{min}$, then P is a potential problem, where $f_{min}$ is the minimum threshold probability that is chosen as a cutoff point for problems with a high enough probability to be sent to the user as an alert. The above described procedures are repeated for all transactions in $T_{do}$.

Correction Function $f_w(W_T)$

Figure 5A:
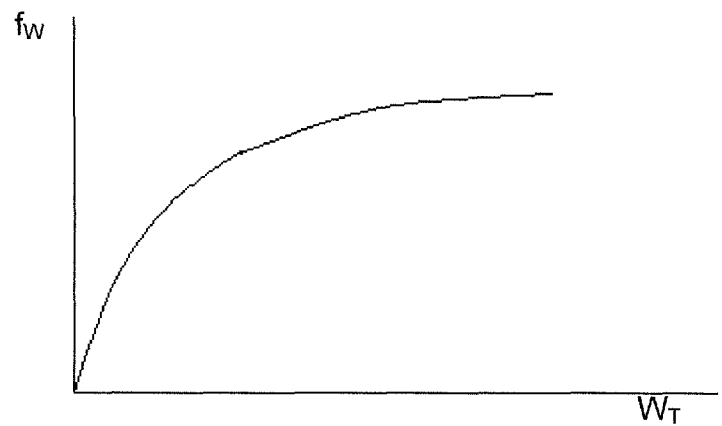
FIGS. 5A-5B are representative graphical illustrations of certain correction functions in accordance with one or more embodiments of the present disclosure.

The basic form of the correction function $f_w(W_T)$ can comprise any number of defined functional forms are determined proper. In one embodiment, the desired functional form may appear as illustrated in FIG. 5A which is represented by the equation:

$$f_w(W_T) = a \times W_T^2 + b \times W_T + c$$

where the following boundary conditions are imposed:

$$f_w(0) = 0$$

$$f_w(W_T \geq W_C) = 1$$

$$\frac{df_w(W_T)}{dW_T}(W_T = W_C) = 0$$

Where $W_C$ is a pre-specified specified value after which point the correction function becomes 1. Applying the boundary conditions obtains the following functional form for $f_w(W_T)$:

$$f_w(W_T) = \frac{W_T^2}{W_C^2}\left(\frac{2W_C}{W_T} - 1\right) \quad W_T \leq W_C$$

$$f_w(W_T) = 1 \quad \text{otherwise}$$

Correction Function $f_t(tc_i)$

Figure 5B:
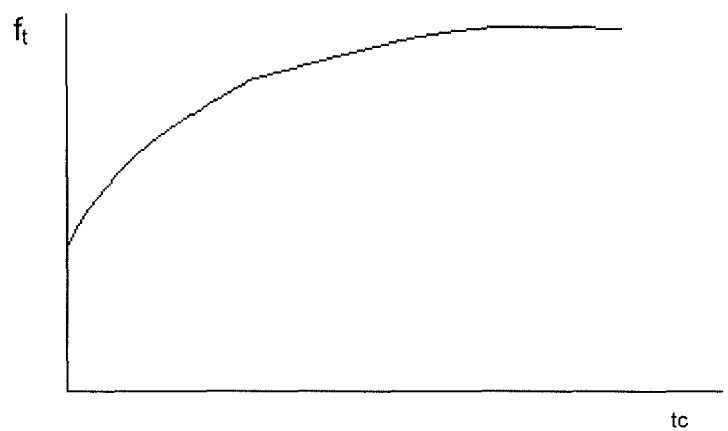

The basic form of the correction function $f_t(tc_i)$ can comprise any number of defined functional forms as determined proper for a particular situation. In one embodiment, the desired functional form may appear as illustrated in FIG. 5B which is further represented by the equation:

$$f_t(tc_i) = 1 - \frac{\alpha_t}{\beta_t + tc_i}$$

$$tc_i = 0, 1, 2, \ldots$$

where the following boundary conditions for this equation are:

$$f_t(0) = f_t^0$$

$$\frac{df_t(tc_i)}{dtc_i}(tc_i = 0) = \text{Tan}\left(\frac{\pi}{2}\zeta_t\right)$$

where $f_t^0$ and $\zeta_t$ are pre-specified values which range between (0,1), where these values must be greater than zero and less than 1. $f_t^0$ represents the starting point of the function (i.e. the base minimum probability for time cut zero for a fingerprint to be valid) and $\zeta_t$ represents the rate of growth of the function. Applying the boundary conditions and solving for the two constants $(\alpha_t, \beta_t)$ obtains:

$$\beta_t = \frac{1 - f_t^0}{\text{Tan}\left(\frac{\pi}{2}\zeta_t\right)}$$

$$\alpha_t = \beta_t(1 - f_t^0)$$

Correction Function $f_s(tc_i)$

In one aspect, the functional form for this correction factor is exactly the same as that of $f_t(tc_i)$, thus:

$$f_s(tc_i) = 1 - \frac{\alpha_s}{\beta_s + N_s} \quad N_s = 0, 1, 2, \ldots$$

$$\beta_s = \frac{1 - f_s^0}{\text{Tan}\left(\frac{\pi}{2}\zeta_s\right)}$$

$$\alpha_s = \beta_s(1 - f_s^0)$$

where $N_s$ is the number of symptoms indicating a problem P at $tc_i$. Looking back at the main equation for probability determination:

$$f_{total}(P, tc_i) = (f_r(P, tc_i)f_w(W_T) - f_t(tc_i))f_s(tc_i) + c$$

From these, it can be seen that certain conditions exist with similar boundary conditions. In one aspect, it can be seen that the minimum value for $f_{Total}(P, tc_i)_{min}$ is zero and the maximum value is one. Thus, the minimum and maximum values for the probability determination can be expressed as:

$$f_{total}(P, tc_i)_{min} = (f_r(P, tc_i)_{min}f_w(W_T)_{min} - f_t(tc_i)_{max})f_s(tc_i)_{min} + c$$

$$f_{total}(P, tc_i)_{max} = (f_r(P, tc_i)_{max}f_w(W_T)_{max} - f_t(tc_i)_{min})f_s(tc_i)_{max} + c$$

It should be noted that minimum and maximum values for the various correlation functions can be described as:

$$f_r(P, tc_i) = [0, 1]$$

$$f_w(W_T) = [0, 1]$$

$$f_t(tc_i) = \left[1 - \frac{\alpha_t}{\beta_t}, 1\right]$$

$$f_s(tc_i) = \left[1 - \frac{\alpha_s}{\beta_s}, 1\right]$$

Where substituting each of the above minimum and maximum values into the equations defined above yields the results:

$$c = f_t^0 = f_s^0 = f^0$$

Multi-Time Cut Probability Determination

In another embodiment, the fingerprint matching process will examine probabilities across multiple time cuts to determine whether a collective number of time cuts together satisfy some criteria indicating that a problem fingerprint event is being detected. The multiple time cut probability determination is invoked in the situation where the probability for any single time cut $f_{Total}(P,tc_i)$ does not meet the minimum probability threshold level $f_{min}$ to generate a problem fingerprint alert but the probabilities for a multiple number of time cuts each exceed another specified threshold, which can also be an indicator of a fingerprint event. While it is understood that other embodiments could select non-adjacent time cuts in the multiple time cut probability determination, the multiple time cuts are preferably selected as adjacent time cuts to indicate a trend or continuity of events in the system having a probability of leading to a problem. Since the multiple time cut probability determination is examining events that occur in multiple time cuts, the probability required to indicate a problem fingerprint over multiple time cuts preferably utilizes a different multiple time cut probability threshold $P_M$ that is lower than the single time minimum probability threshold level $f_{min}$. The multiple time cut probability threshold $P_M$ may be selected to be a fixed value or may alternatively vary with respect to the number of consecutive time cuts. In one aspect, the multiple time cut probability threshold $P_M$ decreases as the number of consecutive time cuts indicating some probability increases. In other words, the larger the number of consecutive time cuts containing some probability of a problem existing, the smaller the threshold value required to indicate a problem fingerprint. Conversely, when consecutive time cuts possess larger probability values, fewer numbers of consecutive time cuts with such probabilities are required to indicate a problem fingerprint.

By way of example, the minimum probability threshold level $f_{min}$ required to generate a problem fingerprint alert for a single time cut may be selected for a particular situation to be 0.75. If the probabilities for the monitored time cuts $f_{Total}(P,tc_i)$ are continuously generating probabilities between 0.4-0.6, then any single time cut will not reach the minimum probability threshold level $f_{min}$ sufficient to generate a problem fingerprint alert. However, the fact that continual probabilities between 0.4-0.6 are being reported during consecutive time cuts indicates that the monitored system is not operating ideally. Thus, a different multiple time cut probability threshold $P_M$ can be selected, such as a value of $P_M$=0.3. When a certain number of consecutive time cuts possess a probability $f_{Total}(P,tc_i)$ above the multiple time cut probability threshold $P_M$ (e.g., 0.3 in this example), then the multiple time cut probability determination will generate a problem fingerprint alert even though the minimum probability threshold level $f_{min}$ for any single time cut was never reached.

Figure 6:
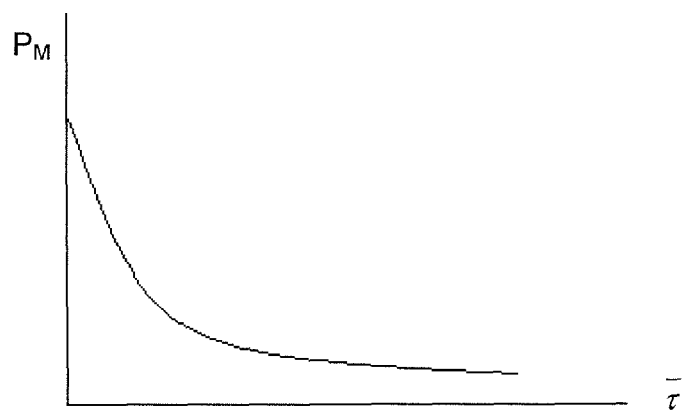
FIG. 6 is a representative graphical illustration of the multiple time cut probability threshold $P_M$ in accordance with one or more embodiments of the present disclosure.

One embodiment of the form for the multiple time cut probability threshold $P_M$ can be represented in the graphical illustration shown in FIG. 6 according to the following equation:

$$P_M(\bar{\tau}) = \frac{a}{e^{b\bar{\tau}}}$$

Where:

$\tau$=number of sequential time cuts for problem determination (2, 3, ..., $t_N$)

$\bar{\tau}=\tau-2$ $P_M(\bar{\tau})$=probability threshold above which a fingerprint is indicated when $\tau$ adjacent time cuts exceeds its value And the boundary conditions are:

$$P_M(0) = P_M^0$$

$$\frac{dP_M(0)}{d\bar{\tau}}(0) = -\text{Tan}\left(\frac{\pi}{2}\zeta_M\right)$$

Such that the first and second boundary conditions lead to:

$$a = P_M^0$$

$$\frac{dP_M}{d\bar{\tau}} = -\frac{bP_M^0}{e^{b\bar{\tau}}} \rightarrow b = \frac{\text{Tan}\left(\frac{\pi}{2}\zeta_M\right)}{P_M^0}$$

Where $P_M^0$ is the minimum probability for two adjacent time cuts to indicate a fingerprint ($\bar{\tau}$=0) and $\zeta_M$ is the rate of decay of the function. This indicates that the value $P_M(\bar{\tau})$ required to indicate a problem gets smaller as the number of adjacent time cuts with probabilities that exceed $P_M(\bar{\tau})$ increases.

In one aspect, to determine whether a fingerprint is indicated through multiple time cuts, a matrix [M] is constructed which contains the information of whether the probabilities at a particular time cut exceeded $P_M(\bar{\tau})$. For example, the matrix [M] may appear as:

$$M = \begin{pmatrix} & tc_i = 0 & 1 & 2 & 3 & 4 & 5 \\ \bar{\tau}=0 & 0 & 1 & 0 & 0 & 0 & 0 \\ \bar{\tau}=1 & 1 & 0 & 1 & 1 & 1 & 0 \\ \bar{\tau}=2 & 1 & 1 & 1 & 0 & 0 & 1 \\ \bar{\tau}=3 & 0 & 1 & 1 & 0 & 1 & 1 \\ \bar{\tau}=4 & 0 & 1 & 1 & 1 & 1 & 1 \end{pmatrix}$$

Where the rows are indexed by r and the columns are indexed by the time cuts $tc_i$. A "1" in the matrix indicates that at the given time cut $tc_i$ and $\bar{\tau}$, the probability $f_{Total}(P,tc_i)>P_M(\bar{\tau})$ otherwise a "0" is inserted into the matrix. Note that since:

$tc_i=(0,1,\ldots,t_N-1)$ $\bar{\tau}=(0,1,\ldots,t_N-2)$ then [M] is an $(t_N-1)\times(t_N)$ matrix. To determine if a fingerprint is indicated for a given $\bar{\tau}$, the values of the matrix for that row are analyzed and if the sum of $\tau=\bar{\tau}+2$ consecutive columns equals $\tau$ then a fingerprint is indicated. The time cut for that fingerprint will be the smallest $tc_i$ of the summed group. As an example, for $\bar{\tau}$=1, three consecutive columns are required to have a value of 1. From the above matrix example, this condition occurs for $tc_i$=2, 3, 4, thereby indicating a fingerprint at time cut 2.

In one aspect, to determine the probability of a fingerprint in a multiple time cut probability determination, the average deviation of the difference between the computed time cut probability $f_{Total}(P,tc_i)$ and $P_M(\bar{\tau})$ is used as a reference. This is defined as:

$$\Delta \equiv \frac{1}{\tau}\sum_{i=1}^{\tau} \frac{f_{total}(P,tc_i) - P_M(\bar{\tau})}{1 - P_M(\bar{\tau})}$$

Figure 7:
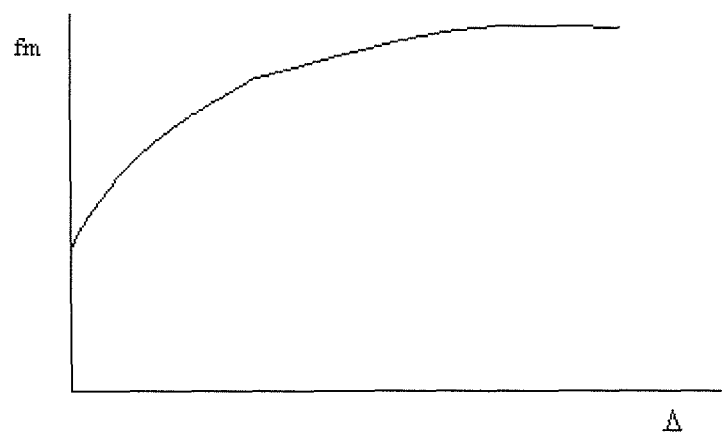
FIG. 7 is a representative graphical illustration relating to the probability of indicating a problem in a multi-time cut scenario in accordance with one or more embodiments of the present disclosure.

$\Delta$ represents the average fractional deviation of the various time cuts within a group of $\tau$ adjacent time cuts, from the theoretical maximum deviation of $1-P_M(\bar{\tau})$. $\Delta$ ranges from (0,1). One embodiment of a desired form of the probability represented by the equation is illustrated by the graphical illustration in FIG. 7.

The boundary conditions for the multi-time cut probability are:

$$f_{Multi}(P, \Delta) = f_{Multi}^0 \quad \text{when } \Delta = 0$$

$$f_{Multi}(P, \Delta) = 1 \quad \text{when } \Delta = 1$$

$$\frac{d f_{Multi}(P, \Delta)}{d\Delta} = 0 \quad \text{when } \Delta = 1$$

where $f_{Multi}(P,\Delta)$ is the probability of indicating a problem P in a multi time cut scenario and $f_{Multi}^0$ represents the minimal probability on indicating a fingerprint for the condition that $f_{Total}(P,tc_i)=P_M(\bar{\tau})$. Through the use of an equation of the form:

$$f_{Multi}(P,\Delta)=a\Delta^2+b\Delta+c$$

and applying boundary conditions, the probability of indicating a problem P in a multi time cut scenario $f_{Multi}(P,\Delta)$ is:

$$f_{Multi}(P,\Delta)=(f_{Multi}^0-1)\Delta^2+2(1-f_{Multi}^0)\Delta+f_{Multi}^0$$

Where if $f_{Multi}(P,\Delta) > f_{min-Multi}$, then a problem fingerprint alert is generated.

In various embodiments, the system and method for generating and correlating fingerprints for automated intelligence is operational in an IT infrastructure or with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Figure 12:
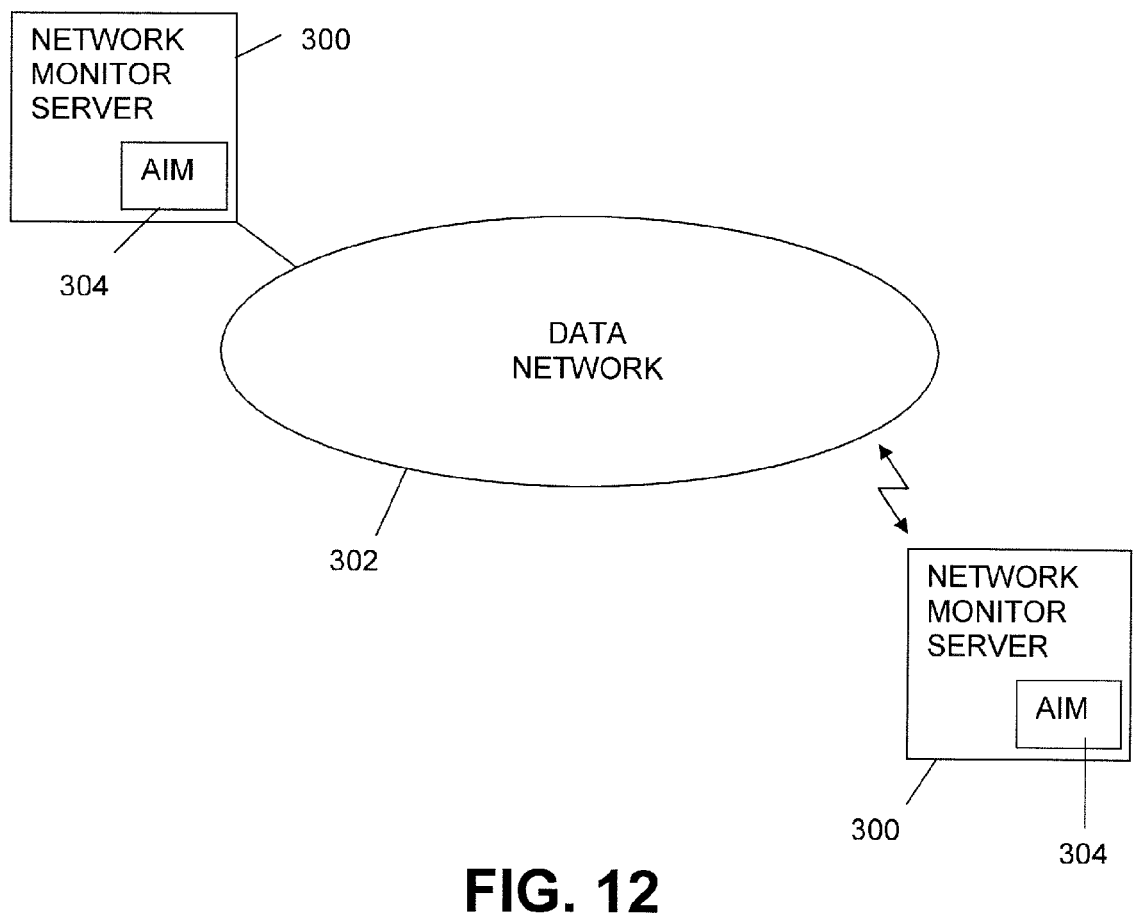
FIG. 12 is a schematic illustration of an exemplary network monitor server configuration of the fingerprint correlation system in accordance with one or more embodiments of the present disclosure.

In one or more embodiments, the system and method for generating and correlating fingerprints for automated intelligence is operational in special-purpose network monitor server 300 that monitors activity occurring on an IT infrastructure or data network 302, as illustrated in FIG. 12. The special-purpose network monitor server 300 includes an automated intelligence module (AIM) 304 installed and operating thereon for performing the functionality of the various methods and modules described herein, including but not limited to a fingerprint capturing module, a problem identifying module, an information collecting module, a fingerprint creation criteria module, a probability weight module, a fingerprint creation or generation module, a fingerprint correlation module, a fingerprint matching or comparison module, and/or a problem prediction module. In one embodiment, the data network 302 comprises the transaction topology 120. The network monitor server 300 may be configured to be integral with the data network 302, directly connected to communicate with the data network 302 or configured to remotely communicate with the data network 302.

The system and method for generating and correlating fingerprints for automated intelligence may be described in the general context of computer-executable instructions, such as program modules, being executed by a computer. Generally, program modules include routines, programs, objects, components, data structures, etc. that perform particular tasks or implement particular abstract data types. The system may also be practiced in distributed computing environments where tasks are performed by remote processing devices that are linked through a communications network. In a distributed computing environment, program modules may be located in both local and remote computer storage media including memory storage devices. The computer programs are stored in a memory medium or storage medium or they may be provided to a processing unit through a network or I/O bus.

In one aspect, the present system for automated intelligence includes at least one central processing unit (CPU) or processor. The CPU can be coupled to a memory, ROM or computer readable media containing the computer-executable instructions for generating and using fingerprints for automated intelligence. Computer readable media can be any available media that can be accessed by the system and includes both volatile and nonvolatile media, removable and non-removable media implemented in any method or technology for storage of information such as computer readable instructions, data structures, program modules or other data. Computer storage media includes, but is not limited to, RAM, ROM, EEPROM, flash memory, portable memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the fingerprint generation and matching systems. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of any of the above should also be included within the scope of computer readable media. The computer readable media may store instructions and/or data which implement all or part of the system described herein.

In one embodiment, the system and method for generating and correlating fingerprints for automated intelligence can be incorporated within J2EE and .NET based application that can be installed in any server environment, such a Windows or Linux server. In one aspect, the present system and method can act as an agentless system where no additional software is required to be installed on the monitored devices. Instead, the present system and method may collect relevant data and perform various system availability and performance tests by sending messages to the monitored systems in the form of ICMP pings, TCP/IP messages, commands over SSH terminal sessions, via Windows Management Instrumentation (WMI) methods and other known communication methods with devices in an IT infrastructure.

Many of the embodiments described herein will be directed toward automated intelligence of an IT infrastructure. However, it is the intention of the present inventors that the present system and method of generating and correlating a fingerprint can be extended to other types of systems and models.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
capturing a first fingerprint of at least a portion of an information technology (IT) infrastructure associated with a certain event relating to the IT infrastructure;
capturing a second fingerprint of at least a portion of the IT infrastructure associated with an event relating to the IT infrastructure; and
determining whether a correlation exists between the first and second fingerprints such that the first and second fingerprints each provide an indication of at least a portion of the same event relating to the IT infrastructure, wherein each of the first and second fingerprints includes a set of rules for a set of time cuts, respectively, wherein each rule in the set of rules includes a probability that a symptom of the event occurs for a specific time cut, wherein the symptom includes a metric and a reason that the event is generated, wherein determining whether a correlation exists comprises determining the degree of match between rules of the first fingerprint against rules of the second fingerprint across the various time cuts.

2. The method of claim 1, further comprising merging the first and second fingerprints together when it is determined that the first and second fingerprints correlate to each other.

3. The method of claim 1, further comprising:
iteratively shifting a phase shift in time cuts between the sets of rules in the first and second fingerprints;
determining a degree of match between the rules of the first fingerprint against rules of the second fingerprint across for each iteration of phase shift; and
determining the phase shift for which a maximum degree of match exists between the sets of rules of the first and second fingerprints and determining a value of the associated maximum degree of match.

4. The method of claim 3, further comprising:
determining whether the value for the maximum degree of match exceeds a certain threshold, and
merging the sets of rules for the first and second fingerprints together when the value for the maximum degree of match exceeds the certain threshold.

5. The method of claim 4, further comprising adjusting the probabilities of the merged sets of rules, wherein the rules having a degree of match between the first and second thresholds have their probabilities increased while rules that do not have a degree of match between the first and second thresholds have their probabilities decreased.

6. The method of claim 1, wherein the first and second fingerprints are captured prior to the occurring event.

7. A non-transitory machine-readable medium having program instructions stored thereon executable by a processing unit of a special-purpose network monitoring server for performing the steps of:
capturing a first fingerprint of at least a portion of an information technology (IT) infrastructure associated with a certain event relating to the IT infrastructure;
capturing a second fingerprint of at least a portion of the IT infrastructure associated with an event relating to the IT infrastructure; and
determining whether a correlation exists between the first and second fingerprints such that the first and second fingerprints each provide an indication of at least a portion of the same event relating to the IT infrastructure, wherein each of the first and second fingerprints includes a set of rules for a set of time cuts, respectively, wherein each rule in the set of rules includes a probability that a symptom of the event occurs for a specific time cut, wherein the symptom includes a metric and a reason that the event is generated, wherein determining whether a correlation exists comprises determining the degree of match between rules of the first fingerprint against rules of the second fingerprint across the various time cuts.

8. The non-transitory machine-readable medium of claim 7, further comprising program instructions stored thereon for:
iteratively shifting a phase shift in time cuts between the sets of rules in the first and second fingerprints;
determining a degree of match between the rules of the first fingerprint against rules of the second fingerprint across for each iteration of phase shift; and
determining the phase shift for which a maximum degree of match exists between the sets of rules of the first and second fingerprints and determining a value of the associated maximum degree of match.

9. The non-transitory machine-readable medium of claim 8, further comprising program instructions stored thereon for:
determining whether the value for the maximum degree of match exceeds a certain threshold, and
merging the sets of rules for the first and second fingerprints together when the value for the maximum degree of match exceeds the certain threshold.

10. The non-transitory machine-readable medium of claim 9, further comprising program instructions stored thereon for adjusting the probabilities of the merged sets of rules, wherein the rules having a degree of match between the first and second thresholds have their probabilities increased while rules that do not have a degree of match between the first and second thresholds have their probabilities decreased.

11. A system comprising:
a fingerprint capturing module for capturing a first fingerprint of at least a portion of an information technology (IT) infrastructure associated with a certain event relating to the IT infrastructure,
the fingerprint capturing module further capturing a second fingerprint of at least a portion of the IT infrastructure associated with an event relating to the IT infrastructure; and
a fingerprint correlation module for determining whether a correlation exists between the first and second fingerprints such that the first and second fingerprints each provide an indication of at least a portion of the same event relating to the IT infrastructure, wherein each of the first and second fingerprints includes a set of rules for a set of time cuts, respectively, wherein each rule in the set of rules includes a probability that a symptom of the event occurs for a specific time cut, wherein the symptom includes a metric and a reason that the event is generated, wherein the fingerprint correlation module is further configured to determine the degree of match between rules of the first fingerprint against rules of the second fingerprint across the various time cuts.

12. The system of claim 11, wherein the fingerprint correlation module further:
iteratively shifts a phase shift in time cuts between the sets of rules in the first and second fingerprints;
determines a degree of match between the rules of the first fingerprint against rules of the second fingerprint across for each iteration of phase shift; and
determines the phase shift for which a maximum degree of match exists between the sets of rules of the first and second fingerprints and determines a value for the associated maximum degree of match.

13. The system of claim 12, wherein the fingerprint correlation module further:
   determines whether the value for the maximum degree of match exceeds a certain threshold, and
   merges the sets of rules for the first and second fingerprints together when the value for the maximum degree of match exceeds the certain threshold.

14. The system of claim 13, wherein the fingerprint correlation module further adjusts the probabilities of the merged sets of rules, wherein the rules having a degree of match between the first and second thresholds have their probabilities increased while rules that do not have a degree of match between the first and second thresholds have their probabilities decreased.

* * * * *